No. 730,164. PATENTED JUNE 2, 1903.
A. T. SARFERT.
STEAMING MACHINE.
APPLICATION FILED JAN. 20, 1898.
NO MODEL. 4 SHEETS—SHEET 1.
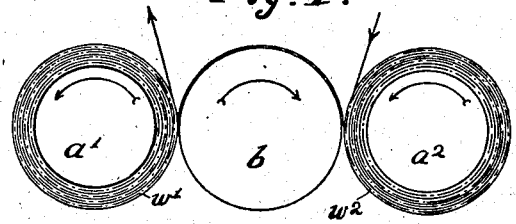
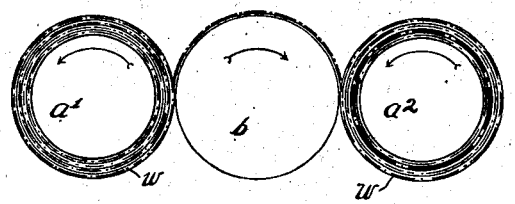
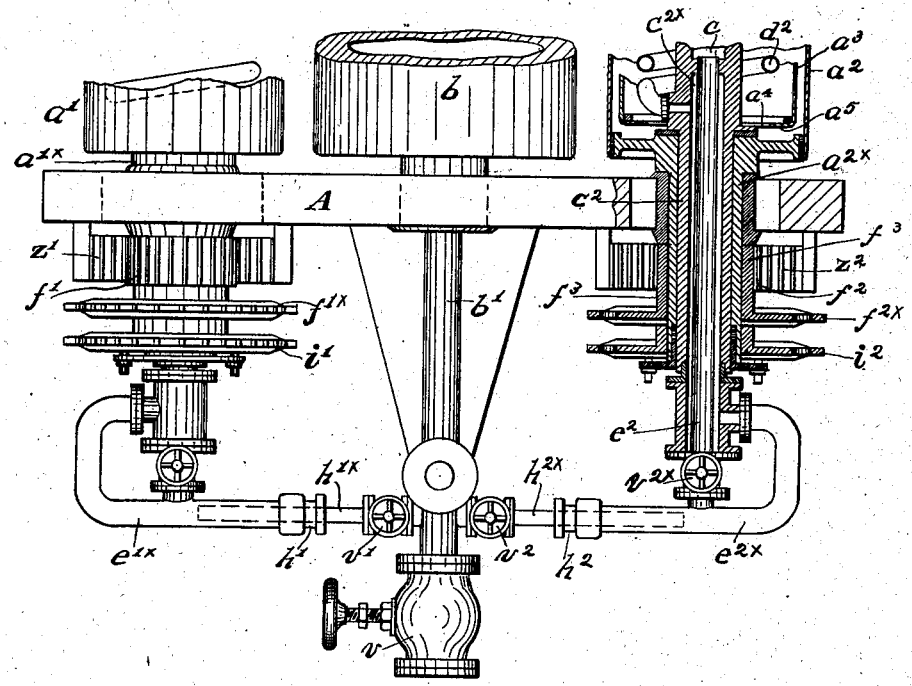

No. 730,164. PATENTED JUNE 2, 1903.
A. T. SARFERT.
STEAMING MACHINE.
APPLICATION FILED JAN. 20, 1898.
NO MODEL. 4 SHEETS—SHEET 2.

Witnesses
Jas. H. Richmond
Edgar Langley

Inventor
Alexander T. Sarfert
By his Attorney
G. Dittmar

No. 730,164. PATENTED JUNE 2, 1903.
A. T. SARFERT.
STEAMING MACHINE.
APPLICATION FILED JAN. 20, 1898.
NO MODEL. 4 SHEETS—SHEET 4.

Witnesses;
J. A. Richmond
Jas. C. Hopkins.

Alexander T. Sarfert
Inventor, by
G. Dittmar Att'y.

No. 730,164.

Patented June 2, 1903.

UNITED STATES PATENT OFFICE.

ALEXANDER THEODOR SARFERT, OF CHEMNITZ, GERMANY, ASSIGNOR TO DAVID GESSNER, OF WORCESTER, MASSACHUSETTS.

STEAMING-MACHINE.

SPECIFICATION forming part of Letters Patent No. 730,164, dated June 2, 1903.

Application filed January 20, 1898. Serial No. 667,336. (No model.)

*To all whom it may concern:*

Be it known that I, ALEXANDER THEODOR SARFERT, a subject of the Emperor of Germany, and a resident of Chemnitz, Saxony, Germany, have invented certain new and useful Improvements in Steaming-Machines; and I do hereby declare the following to be a full and clear description of the invention, such as will enable others skilled in the art to which it appertains to make and use the same.

In my United States Patent No. 516,945, dated March 20, 1894, I have shown a construction of steaming-cylinder consisting of a perforated shell, a water-holding shield within said shell, a steam-discharger within said shield from which the steam is discharged that passes by said shield and escapes through the perforations in the shell, and a heat-radiator, also within said shield, the radiated heat from which serves to maintain the steam within the cylinder in a condition of proper temperature and dryness preparatory to its escape through said perforations into the cloth. In the machine in which said cylinder was combined, as described in said patent, however, only fair results were obtained either in quality or quantity; and one object of my present invention is to combine a cylinder containing substantially the aforesaid features with other mechanism, so that as the result of such new combination the best results can be obtained from my present machine, both as regards quality and quantity.

My present invention also includes other features hereinafter described, and pointed out in the claims.

In the accompanying drawings I have shown a form of machine in which my present invention may be embodied.

Figure 4:
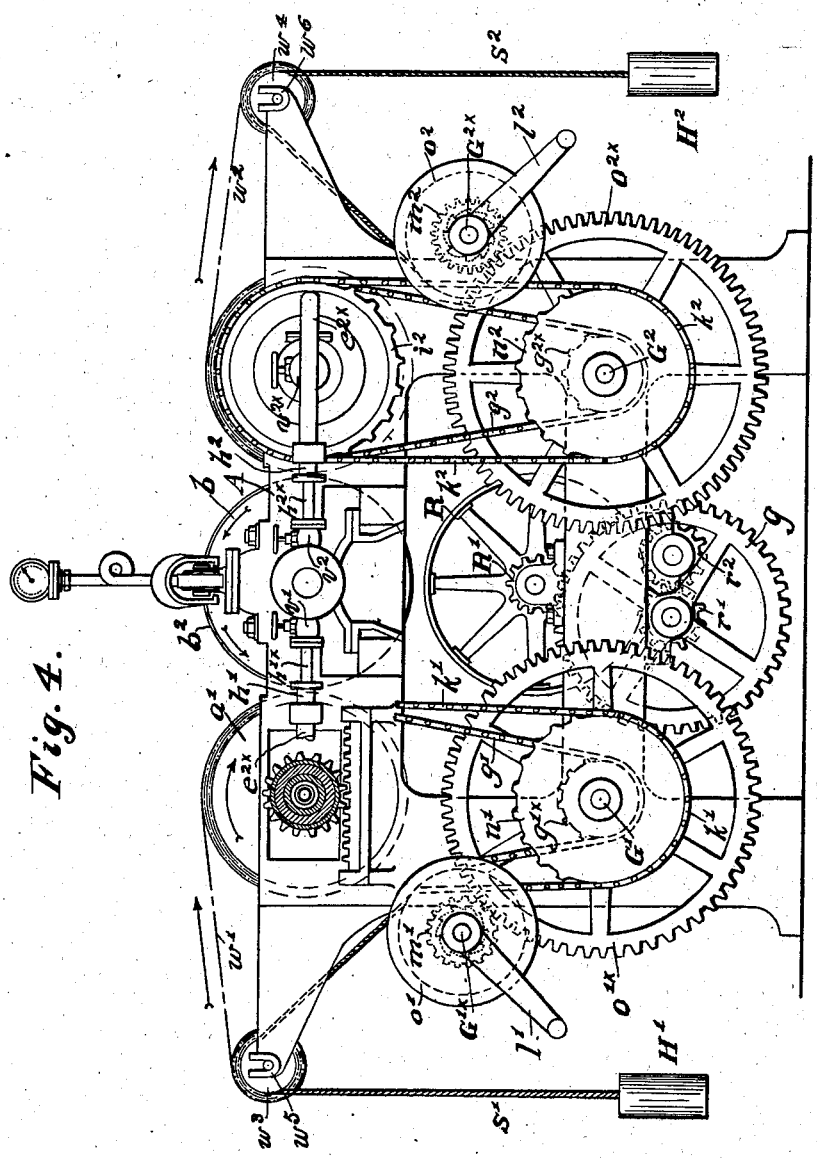
Figure 5:
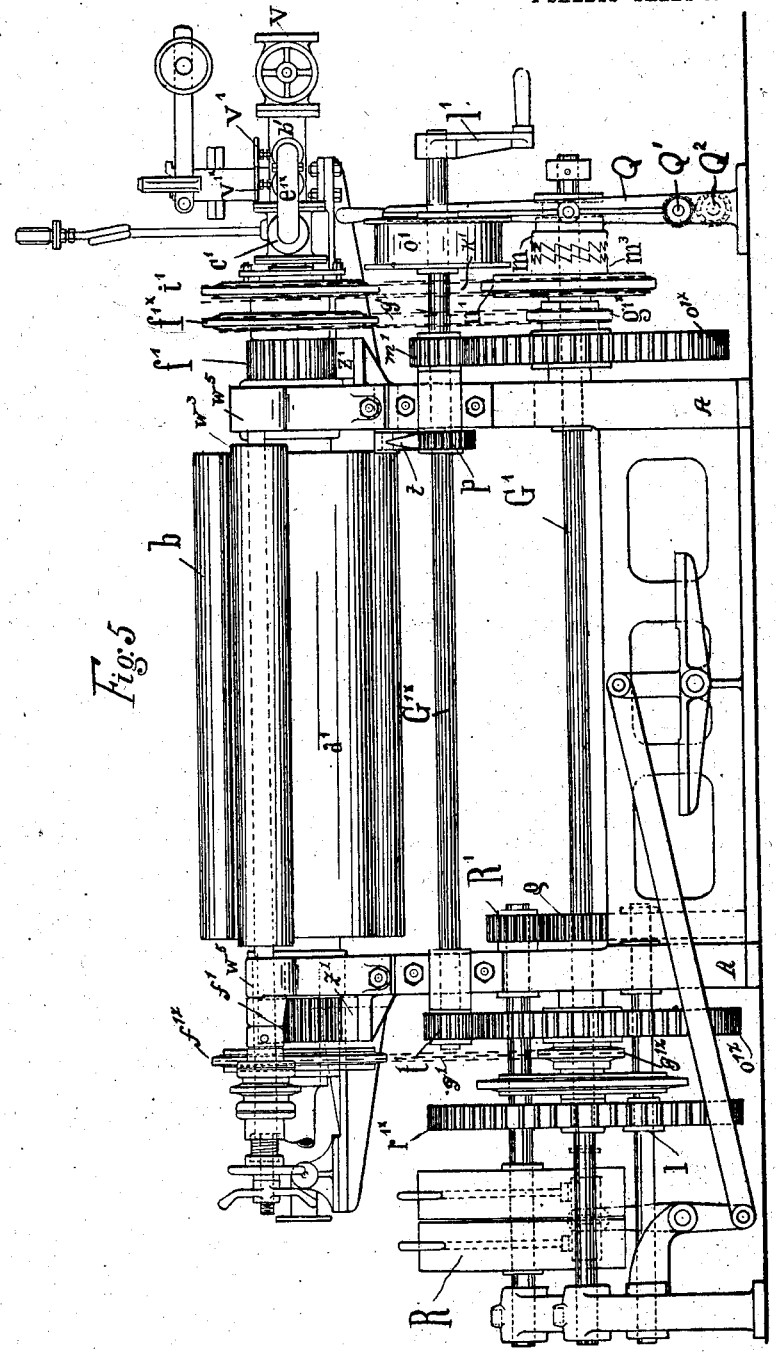
Figure 6:
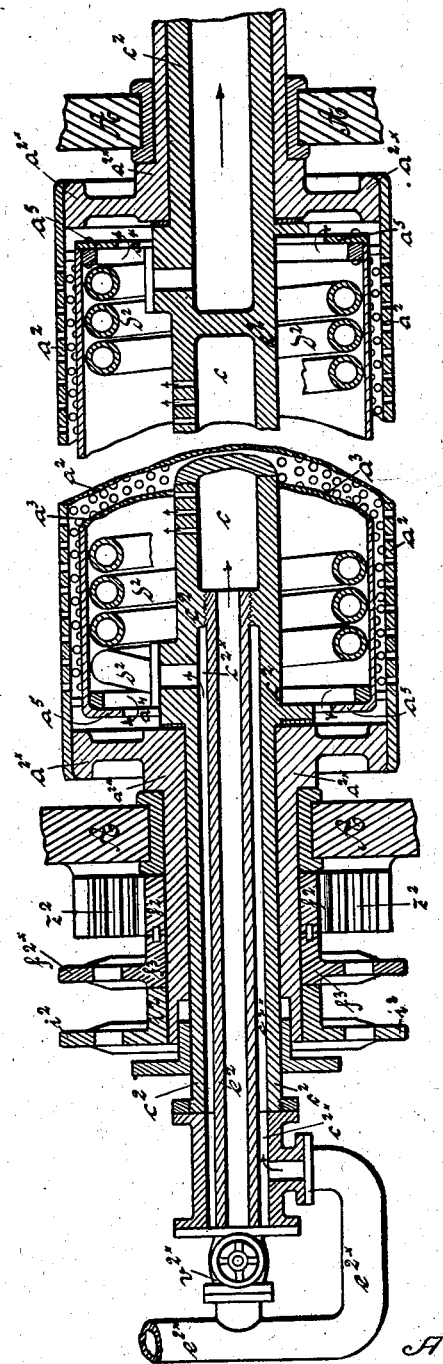

Figure 1 is a diagram showing how two pieces of goods may be steamed, one being wound as the other is unwound, and vice versa. Fig. 2 is a diagram illustrating how a piece of goods may be steamed twice when two cylinders are employed. Fig. 3 is a side elevation of the machine, partly in section. Fig. 4 is a plan view of a portion of the machine, partly in section. Fig. 5 is a front elevation of the machine. Fig. 6 is a longitudinal section of one of the steaming-cylinders, the center of which is broken away.

$a'$ and $a^2$ are the perforated shells of two steaming-cylinders. A description of one cylinder will answer for both. The perforated shell $a^2$ is secured to a sleeve $a^{2\times}$, which sleeve is rotatably mounted upon a fixed or stationary shaft $c^2$ in such a way that the cylinder is steam-tight, excepting at its perforated periphery. The shaft $c^2$ is bored longitudinally, so as to form separated steam-passages $c$ and $c^{2\times}$. The passage $c^{2\times}$ communicates with the steam-coil $d^2$, which forms a heat-radiator in the space around the shaft $c^2$. The steam-pipe $e^{2\times}$ supplies steam to the passage $c^{2\times}$, which passes thence under high tension through the steam-coil $d^2$ without allowing any steam to escape into the space between the coil and the cylinder-shell. This steam, which passes through the radiator $d^2$, I will refer to for convenience as the "heating-steam."

$e^2$ is a steam-pipe passing longitudinally through the passage $c^{2\times}$ and communicating with the passage $c$, as shown. The pipe $e^2$ also communicates with the steam-supply pipe $e^{2\times}$, but may be cut off from the same by the valve $v^{2\times}$. The steam supplied to the passage $c$ from the pipe $e^2$ is discharged under lower tension from the passage $c$ into the space within the shell $a^2$, heated by the radiator $d^2$. This steam, which for convenience I will call the "steaming-steam," passes thence through the perforations in the shell $a^2$ into the cloth.

$a^3$ is a cylinder interlying the perforated shell $a^2$ and constituting a water shield or trap to hold back water of condensation from access to the perforations in the shell $a^2$. A suitable passage is provided for the steaming-steam past the shield $a^3$, which passage is shown in the drawings as consisting of an opening $a^4$ between the shaft $c^2$ and the inward projection $a^5$ at the end of the shield. The perforated shell $a^2$ and the sleeve $a^{2\times}$, to which it is fixed, are rotated by the sprocket-wheel $i^2$, fixed to said sleeve.

$f^3$ is a sleeve rotatably mounted on the sleeve $a^{2\times}$. To the sleeve $f^3$ are fixed a sprocket-wheel $f^{2\times}$ and a pinion $f^2$, which pinion engages with a rack $z^2$.

$b$ is an imperforate drum, which can also be heated by steam led through its journal through the pipe $b'$.

The drum $b$ and the steaming-cylinders $a'$ and $a^2$ are supported on the frame A in substantially the same horizontal plane, the steaming-cylinders being arranged on opposite sides of the drum $b$. It is necessary to provide for producing pressure between the drum $b$ and each of the steaming-cylinders, and in the particular construction shown in the drawings (to which I do not limit myself, however) this is accomplished by sliding the bearings of the two steaming-cylinders toward the cylinder $b$ on opposite sides thereof. This sliding is produced by the action of the pinions $f'$ and $f^2$, respectively, upon the stationary racks $z'$ and $z^2$, respectively. For this purpose the sprocket-wheels $f'^{\times}$ and $f^{2\times}$ are driven by sprocket-chains $g'$ $g^2$ from sprocket-wheels $g'^{\times}$ $g^{2\times}$, loosely mounted upon the shafts G' and G$^2$ and rigidly connected with the cog-wheels $o'^{\times}$ and $o^{2\times}$, respectively.

H' and H$^2$ are weights hanging upon suspenders $s'$ $s^2$, which are secured to reels $o'$ $o^2$, keyed upon the shafts G'$^{\times}$ G$^{2\times}$.

$m'$ $m^2$ are pinions also keyed upon the shafts G'$^{\times}$ G$^{2\times}$ and are in gear with the cog-wheels $o'^{\times}$ $o^{2\times}$, connected with the sprocket-wheels $g'^{\times}$ $g^{2\times}$.

It will be understood from the above that the tension of the weights on the sprocket-chains $g'$ $g^2$ acting through the sprockets $f'^{\times}$ and $f^{2\times}$ and the pinions $f'$ $f^2$ on the racks $z'$ and $z^2$ will tend to force both of the steaming-cylinders bodily against the drum $b$. At the same time said force is yielding, so that the steaming-cylinders may retreat as the cloth accumulates. The pipes $e'^{\times}$ and $e^{2\times}$ are connected with the pipes $h'^{\times}$ and $h^{2\times}$ by means of stuffing-boxes $h'$ and $h^2$ to permit of this movement.

The steam-pipes $h'^{\times}$ and $h^{2\times}$ are supplied with steam from the pipe $b'$ and are each provided with a valve $v'$ $v^2$. The pipe $b'$ is supplied with a valve $v$.

Motion is imparted to the cylinders $a'$ $a^2$ from a belt-pulley R, from which the motion is transmitted by means of the cog-wheels R' $g$ $r'$ $r^2$ $r'^{\times}$ $r^{2\times}$, the shafts G' G$^2$, and the chains $k'$ $k^2$. The shafts G' and G$^2$ carry, respectively, the movable clutch-couplings $m$, which can be moved separately by hand into the coöperating parts $m^3$, respectively, connected with the sprocket-wheels $n'$ $n^2$, so that the cylinders $a'^{\times}$ $a^{2\times}$ may be made to revolve by means of the chains $k'$ $k^2$. When the clutch members $m$ $m^3$ on shaft G' are in engagement, the sprocket-wheel $n'$ drives, by means of the chain $k'$, a sprocket-wheel $i'$, which is secured upon the sleeve $a'^{\times}$, carrying the cylinder $a'$. When, however, the clutch members $m$ $m^3$ on shaft G$^2$ is moved into engagement, the sprocket-wheel $n^2$ will turn by chain $k^2$ the sprocket-wheel $i^2$ upon sleeve $a^{2\times}$, and thus will impart motion to the cylinder $a^2$. These clutches are operated oppositely by connection with two arms, one of which, Q, is shown in Fig. 5 secured, respectively, upon shafts Q' and Q$^2$, which are connected by pinions, as shown in Fig. 5. The direction in which the apron is wound is such that the force of winding it on one cylinder unwinds it from the other cylinder, the clutch members of shaft G' being out of engagement while those of G$^2$ are engaged, and vice versa. Hand-cranks $l'$ $l^2$, respectively, are used to lift up the weights H' H$^2$, respectively, and an ordinary ratchet-wheel $p$, Fig. 5, on each shaft G'$^{\times}$, and G$^{2\times}$, coöperating with a pawl $t$, holds each weight suspended until its power is needed for producing pressure, when the attendant can bring the tension of the proper weight H' or H$^2$ to bear by lifting the proper pawl.

$b^2$ is an apron of steam-pervious material, secured at one end to the cylinder $a^2$ and passing spirally around the same and thence over the heated drum $b$ and spirally around another cylinder, to which its other end is secured. This apron should be of sufficient length and width so that the portion thereof wound on either one of the steaming-cylinders will cover the largest piece of cloth to be treated. In the particular construction shown in the drawings one steaming-cylinder, as $a'$, is made to do as the cylinder upon which the apron is wound from the other, as $a^2$, and vice versa, and thus two steaming-cylinders can be operated with a single apron and without any additional apron-winding cylinder; but I do not in all cases limit myself to this construction.

$w^3$ $w^4$ are cloth-beams, and $w^5$ $w^6$ are open bearings on the frame in which said beams rest on opposite sides of the cylinders and about on a level with the same.

The piece of cloth W' from the roll on beam $w^3$ is carried over the top of the cylinder $a'$ and wound thereon with the apron $b^2$. The piece of cloth W$^2$ from the roll on beam $w^4$ is carried over the top of cylinder $a^2$ and wound thereon with the apron $b^2$.

The operation of the machine is as follows: The apron $b^2$ is at first secured to one of the cylinders $a^2$ and is rolled upon the same by giving it a left-hand motion. The end of this apron is brought over the heated drum $b$ and is secured to the other steaming-cylinder $a'$. When the cylinder $a'$ has been heated by the radiator $d^2$, the goods are also brought upon it and rolled up, together with the apron, during which rolling up the goods are steamed and pressed. When the goods are sufficiently steamed, the cylinder $a'$ is disengaged (by throwing clutch $m$ out of connection with $m^3$ on shaft G') and the cylinder $a^2$ is brought into connection by its respective coupling, so that the same receives now a left-hand revolution. Thus while the goods are being unrolled from the cylinder $a'$ a new piece of goods may be rolled upon the cylinder $a^2$, together with the apron, and thereupon this second piece of goods is steamed.

For a certain class of goods it is necessary that the steaming be repeated, which may be done by rolling up the goods in the reversed direction. In this case the cylinder $a^2$ is turned to the left, and the goods being unrolled from $a'$ are passed over the drum $b$ and are rolled upon the cylinder $a^2$, where they are steamed and pressed once more.

In both methods of application the covering cloth is guided over the heated drum $b$, where it is sufficiently dried and heated, so that it cannot produce a condensation of the vapors.

The good quality of the work done by this machine is due to the fact primarily that the goods are with the apron wound upon a steaming-cylinder of the character described, the repeated alternate layers of apron and cloth around the cylinder presenting the proper conditions, as I have discovered, for the successful action of such a quality of steam as is emitted from the perforations of such a steaming-cylinder as that described. The good quality of the work is also due in a measure to the conditions acting upon the apron just prior to the cloth entering between its successive layers on the steaming-cylinder; also, to the uniform pressure of the drum $b$ at the point where the winding of the cloth on the steaming-cylinder starts.

The quantity of the work turned out is due largely to the fact that while one piece of cloth is being rolled another may be unrolled, and vice versa.

The steaming-cylinder shown in the drawings and above described embodies features of invention over the forms of steaming-cylinder shown in my said Patent No. 516,945; but these features of invention are shown herein merely to complete the description and are not claimed herein, being claimed, together with further features of invention relating to the steaming-cylinder, in another application filed by me April 20, 1900, Serial No. 13,577.

I claim—

1. In a cloth-steaming machine, a cylinder containing a perforated shell, a water-detaining shield, a radiator and a steam-discharger within said shell, in combination with a steam-pervious apron adapted to be wound spirally on said cylinder and a presser whereby said apron and the cloth are pressed as they are together wound spirally on said cylinder.

2. In a cloth-steaming machine, a cylinder containing a perforated shell, a water-detaining shield, a radiator and a steam-discharger within said shell, in combination with a steam-pervious apron adapted to be wound spirally on said cylinder and a heated presser whereby said apron and the cloth are pressed as they are together wound spirally on said cylinder.

3. In a cloth-steaming machine, a cylinder containing a perforated shell, a water-detaining shield, a radiator and a steam-discharger within said shell, in combination with a steam-pervious apron adapted to be wound spirally on said cylinder, a presser whereby said apron and cloth are pressed as they are wound together spirally on said cylinder and a support constructed, substantially as described, whereby separation is permitted between said cylinder and said presser as the cloth accumulates.

4. In a cloth-steaming machine, in combination, a steaming-cylinder, an apron having one end secured to said cylinder, a cylinder to which the opposite end of said apron is secured and a heated surface in contact with which said apron travels whereby the apron is dried preparatory to being wound with the cloth upon said steaming-cylinder.

5. In a cloth-steaming machine, in combination, two steaming-cylinders, an apron having its ends secured to them in such manner that it may be unwound from one when being wound upon the other, and pressing mechanism whereby pressure may be exerted against that cylinder whereon the apron is being wound.

6. In a cloth-steaming machine, in combination, two steaming-cylinders, an apron having its ends secured to them in such manner that it may be unwound from one when being wound upon the other, pressing mechanism whereby pressure may be exerted against that cylinder whereon the apron is being wound, driving mechanism and means whereby the same may be connected with either of said cylinders.

7. In a cloth-steaming machine, in combination, two steaming-cylinders, means whereby each of the same may be driven and a steam-pervious apron having its opposite ends secured to said steaming-cylinders, respectively.

8. In a cloth-steaming machine, in combination, two steaming-cylinders, means whereby each of the same may be driven, a steam-pervious apron having its opposite ends secured to said steaming-cylinders, respectively, and pressing mechanism.

9. In a cloth-steaming machine, in combination, two steaming-cylinders, means whereby each of the same may be driven, a steam-pervious apron having its opposite ends secured to said steaming-cylinders respectively and a presser common to said two cylinders.

10. In a cloth-steaming machine, in combination, two steaming-cylinders, a pressing-cylinder interposed between, means whereby pressure may be exerted between said pressing-cylinder and either of said steaming-cylinders and a steam-pervious apron having its opposite ends secured to said steaming-cylinders, respectively.

11. In a machine for steaming cloth, in combination, the perforated shell of a steaming-cylinder, a radiator and a steam-discharger therein, a heated pressing-drum, a steam-pervious apron adapted to be rolled upon said cylinder with the fabric to be steamed and means for producing a relative bodily movement between said drum and said shell.

12. In a cloth-steaming machine, in combination, a pair of perforated steaming-cylinder shells, a radiator and a steam-discharger in each of said shells, a heated pressing-drum intermediate said shells, a steam-pervious apron adapted to be rolled upon said shells with the fabric to be steamed and means for producing relative bodily movement between said drum and each of said shells.

13. In a cloth-steaming machine, in combination, the frame A, the pressing-cylinder $b$, adapted to bear upon either of the steaming-cylinders, the steaming-cylinders $a'$ and $a^2$ and the cloth-beam supports $w^5$ and $w^6$ all arranged in an approximately horizontal plane at the top of said frame.

14. In a cloth-steaming machine, in combination, the frame A, the pressing-cylinder $b$ at the top thereof and the steaming-cylinders $a'$ and $a^2$ arranged on opposite sides of said pressing-cylinder, also at the top of said frame.

15. In a cloth-steaming machine, in combination, the frame A, the pressing-drum $b$ at the top of said frame, the steaming-cylinders $a'$, $a^2$, on opposite sides of said pressing-drum, the shafts $G'$, $G^2$ and means whereby each of said shafts may be thrown into operative connection with one of said steaming-cylinders.

16. In a steaming-machine, in combination, two steaming-cylinders, an apron secured at opposite ends to said cylinders respectively, and an apron-drying drum over which said apron passes between said steaming-cylinders.

17. In a cloth-steaming machine, in combination, two steaming-cylinders, a pressing-cylinder, supports permitting of relative movement between said pressing-cylinder and said steaming-cylinders, two motors, and mechanism whereby said motors may be caused to produce said relative movement alternately in opposite directions.

18. In a cloth-steaming machine, in combination, two steaming-cylinders, a pressing-cylinder, supports admitting of relative movement between the same, two motors, levers $l'$ and $l^2$ whereby said motors are wound up and connections whereby the power of said motors tend to produce said relative motion in opposite directions.

19. In a cloth-steaming machine in which the cloth is steamed while being wound spirally with an apron fabric on a steaming-cylinder, in combination, two steaming-cylinders, means whereby a piece of cloth and an apron may be wound spirally upon one of said steaming-cylinders, means whereby another piece of cloth and an apron may be wound spirally upon the other of said steaming-cylinders, a prime mover and means for connecting or disconnecting said prime mover with each of said steam-cylinders whereby one steaming-cylinder may be driven to wind independently of the other.

20. In a cloth-steaming machine, in combination, a steaming-cylinder, an apron having one end secured on said steaming-cylinder, a cylinder on which the opposite end of said apron is secured, a presser in contact with which said apron travels between said cylinders and means whereby a relative to-and-fro motion is produced between said steaming-cylinder and said presser.

21. In a cloth-steaming machine, in combination, a steaming-cylinder, an apron having one end secured on said steaming-cylinder, a cylinder on which the opposite end of said apron in secured, a rotating presser in contact with which said apron travels between said cylinders and means whereby a relative to-and-fro motion is produced between said steaming-cylinder and said rotating presser.

22. In a machine for steaming cloth, in combination, the perforated shell of a steaming-cylinder, a radiator and a steam-discharger therein, a presser, a steam-pervious apron adapted to be rolled upon said cylinder with the fabric to be steamed and means whereby a relative to-and-fro motion may be produced between said steaming-cylinder and said presser.

23. A cloth-finishing machine provided with two sponging-cylinders and an apron, means whereby cloth may be fed to either cylinder, and means for simultaneously conducting cloth from the other cylinder while the apron passes from the latter to the cylinder receiving the cloth.

24. A cloth-finishing machine provided with an apron and two sponging-cylinders arranged so that either may receive the apron unwound from the other, and means for conducting cloth from the latter cylinder and for feeding it to the former.

25. The combination in a cloth-finishing machine of an apron and two sponging-cylinders, means for feeding cloth to and from each and the apron of one to the other and adjustable driving-gear arranged to be thrown into gear with one cylinder and simultaneously out of gear with the other.

26. The combination in a cloth-finishing machine, two sponging-cylinders and an intermediate press-cylinder, and yielding supports for maintaining the contact of the press and sponging cylinders.

27. In a cloth-steaming machine, in combination, a steaming-cylinder, an apron having one end secured to said cylinder, a cylinder to which the opposite end of said apron is secured, means for winding the apron upon either cylinder and a presser adapted to act upon that cylinder upon which the apron is being wound.

28. In a cloth-steaming machine, the combination with two cylinders, one cylinder being provided with steaming mechanisms, of a steam-pervious apron, means for winding said apron from one cylinder to the other and a presser adapted to act upon either cylinder.

29. In a cloth-steaming machine, the combination with two cylinders, one cylinder being provided with steaming mechanisms, of a steam-pervious apron, means for winding said apron from one cylinder to the other and means for pressing the apron as it is wound upon the steaming-cylinder.

30. In a machine for steaming cloth, in combination, a perforated steaming-cylinder, a radiator and a steam-discharger therein, a pressing-drum, a steam-pervious apron adapted to be wound upon said cylinder with the fabric being treated, and means for producing a relatively bodily movement between said drum and steaming-cylinder.

31. In a cloth-steaming machine, in combination, a cylinder containing a perforated periphery and a steam-pipe through its journal, a steam-pervious apron and means whereby the cloth and said apron are spirally wound on said cylinder.

ALEXANDER THEODOR SARFERT.

Witnesses:
FREDERICK J. DIETZMAN,
H. THIELE.